Patented Apr. 9, 1929. 1,708,228

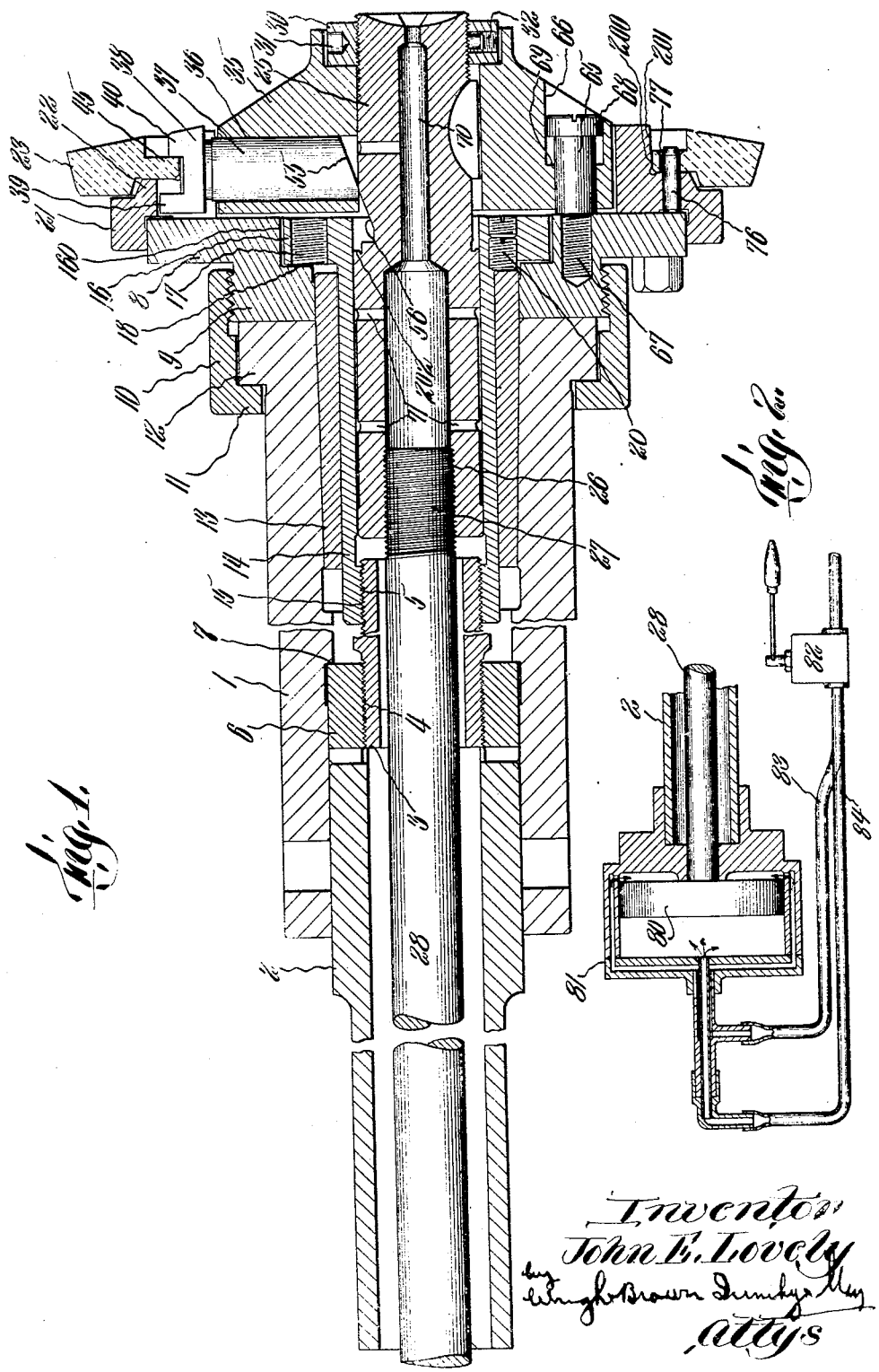

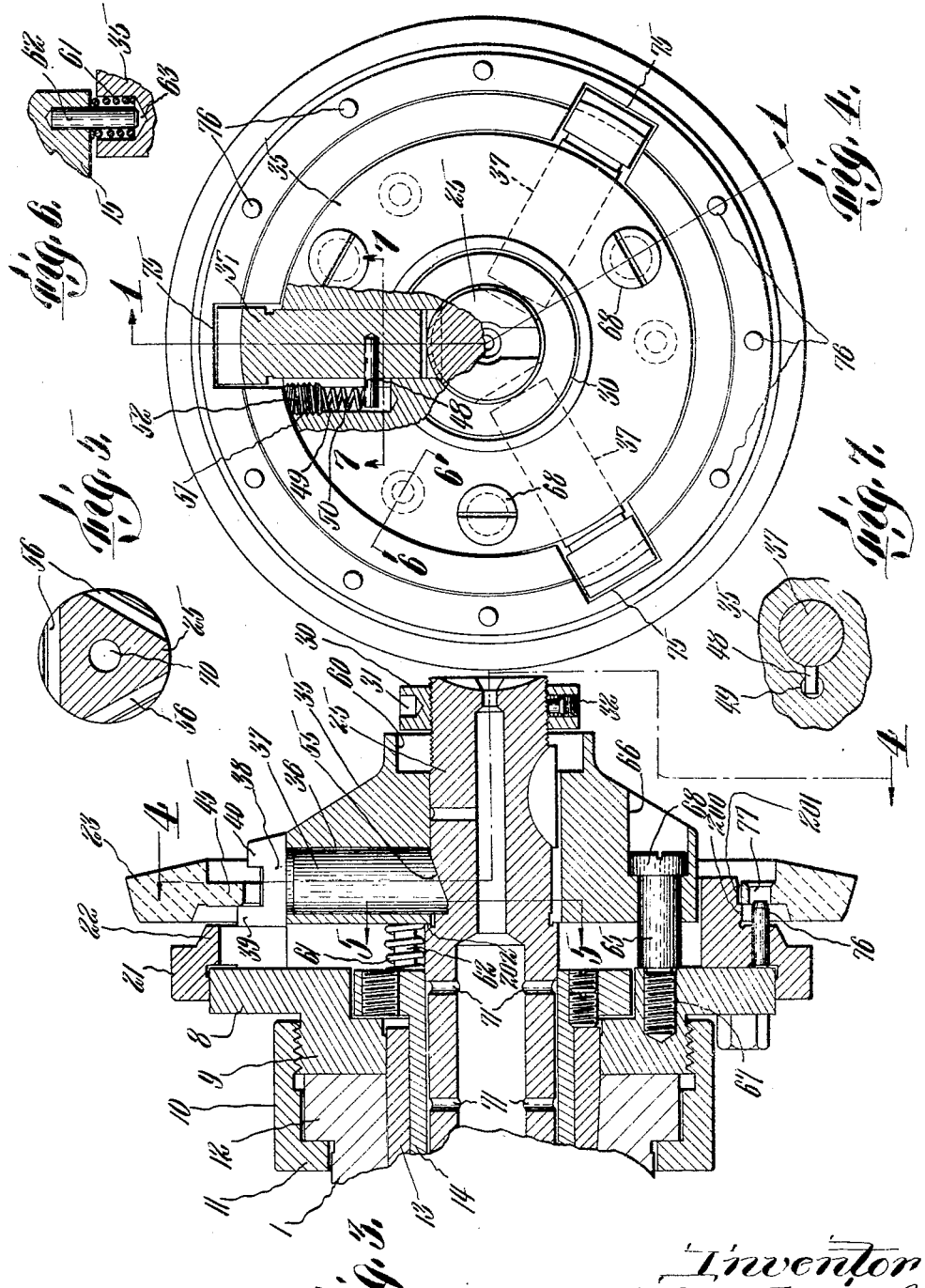

UNITED STATES PATENT OFFICE.

JOHN E. LOVELY, OF SPRINGFIELD, VERMONT, ASSIGNOR TO JONES & LAMSON MACHINE COMPANY, OF SPRINGFIELD, VERMONT, A CORPORATION OF VERMONT.

FIXTURE FOR HOLDING RING GEARS AND THE LIKE.

Application filed May 1, 1924. Serial No. 710,288.

This invention relates to fixtures for holding ring gears or similar work in position for machining, the fixture of the present invention being so constructed that the work may be placed thereon and then by power clamped in proper assembling relation for the machining operations. The power means is also actuable to move the work from the mating clamping member or locating plate and to release the work from its centered position so that it may be freely removed. For this purpose the fixture is provided with radially movable centering jaws carried by the movable clamping member, these jaws being retracted when the clamp is open to permit the work to be readily placed thereon. On actuation of the power means these jaws are moved outwardly radially to engage the work and the movable clamping member carrying the jaws therewith is then brought toward the other clamping member to bring the work over an accurate centering pilot to hold the work against the mating clamping member accurately at right angle to the spindle axis. For releasing the work the first action is to remove the work from the pilot and locating plate and thereafter the movable clamping jaws are retracted from the work so that it may be removed therefrom.

For a more complete understanding of this invention reference may be had to the accompanying drawings in which Figure 1 is a longitudinal section through a spindle mechanism embodying this invention, the work being in clamped position, the section being taken on line 1—1 of Figure 4.

Figure 2 is a fragmentary view partly in section showing the power actuated mechanism.

Figure 3 is a fragmentary section similar to a portion of Figure 1, but showing the work in released position.

Figure 4 is a transverse section on line 4—4 of Figure 3.

Figure 5 is a detail section on line 5—5 of Figure 3.

Figures 6 and 7 are detail sections on line 6—6 and 7—7, respectively, of Figure 4.

Referring first to Figures 1 and 2, 1 indicates a rotary spindle of a lathe such as the well known Fay lathe. In one end of this spindle is fixed an extension 2. Within the spindle 1 is positioned a draw tube 3 having its opposite ends threaded as at 4 and 5. On the threaded portion 4 is engaged a threaded nut or sleeve 6 of annular cross section and of sufficient external diameter to be engaged behind an annular shoulder 7 on the interior of the spindle 1. On the forward end of the spindle 1 may be positioned an adapter plate 8. This adapter plate has an externally threaded hub 9 with which engages a threaded collar 10, this collar having an inturned annular flange 11 engageable back of an annular flange 12 on the end of the spindle. By this means the adapter plate 8 may be clamped firmly against the end of the spindle, for this purpose the collar 10 being screwed firmly thereon.

Within the forward end of the spindle 1 is a tapered bushing 13 and engaging its inner bore of uniform diameter is a sleeve 14. This sleeve has an internally threaded end at 15 engageable with the threads 5 of the draw tube. At the forward end of this sleeve is an enlarged flange portion 16 which may be seated within a counterbored portion 160 in the forward face of the adapter plate 8 to be pressed against the inner wall of this counterbored portion as the sleeve 14 is screwed on to the draw tube. By this means the sleeve 14 may be clamped rigidly to rotate with the spindle, the spindle being engaged between the collar or nut 6 and the flange portion 16. In order to further rigidly hold these parts in position screws as 17 may be threaded through the flange 16 and bear at their inner ends on the shoulder 18 formed at the base of the counterbored portion 160. Also threaded through the flange 16 may be set screws 20 bearing on the outer ends of the tapered bushing 13 by which this bushing may be moved axially to take up any lost motion.

The adapter plate 8 carries at its periphery an annular locating plate or ring 21 having an annular projecting rib 22 against the outer face of which may be engaged the ring gear or other work 23. The contour of the outer face of the locating plate or ring, of course, should be made to correspond with the contour of the work to be held so that this work may be held against the outer face thereof and be properly supported for the machining operation.

Slidable within the sleeve 14 is a rod 25 having at its inner end an internally threaded socket 26 with which may be engaged the inner externally threaded end 27 of a draw rod 28. The outer end of the rod 25 is externally threaded for the reception of a circular nut 30 which may have spaced holes 31 extending inwardly from its periphery for the reception of a spanner wrench by which it may be turned. A set screw 32 may also be threaded therethrough by which the nut may be fixed to the rod 25 in any desired position. Between the nut 30 and the outer face of the adapter plate is positioned a movable clamping member or holder 35, this being slidable on the rod 25 but keyed against rotation relative thereto. This holder is provided with a series of radially arranged perforations 36 within each of which is slidable a pin element 37. These pin elements carry or have formed at their outer ends jaws 38, each of these jaws as shown having outwardly extending flanges 39 and 40 at opposite ends, the jaw 39 being extended further than the jaw 40. These jaws are spaced to receive a portion of the work therebetween, as shown the work having an annular web or flange 45 of somewhat less thickness than the space between the jaws 40 and 39. Each of the pin elements 37 is normally urged inwardly toward the rod 25 and for this purpose it has fixed therein a laterally extending pin 48 slidable within a slot 49 in the holder 35 and on which bears a spring 50. The outer end of each spring reacts against a plug 51 threaded in an enlarged opening 52 in the holder at the outer end of the slot 49. The inner end of each element 37 is beveled, as shown at 55, and the rod 25 has a complementally beveled depression 56 therein in radial alinement with each element 37. When the rod 25 is slid outwardly to bring the nut 30 on its outer end out from the counterbored portion 60 in its outer end as shown in Figure 3, the beveled portion 55 of each element 36 may rest against the beveled faces 56 of the rod 25 as shown in Figure 3, these elements 37 being urged into this position by means of their springs 50. In this position the elements 37 are retracted so as to bring the jaw elements 38 toward each other and permit the work to be moved axially and freed therefrom. When the rod 25 is moved in a direction to bring the nut 30 within the counterbore portion 60, the beveled faces 55 are caused to ride up the inclined faces 56 so as to project the elements 37 outwardly to bring the faces of the jaws 38 between the projections 39 and 40 into engagement with the inner periphery of the work. After the elements 37 are in firm engagement with the work further inward motion of the rod 25 causes the holder 35 to move toward the adapter plate 8, thus bringing the work against the locating plate 21 and clamping it firmly thereagainst so that when the spindle is rotated the work must rotate therewith in proper relation thereto for the machining operation.

For some classes of work the jaws 38 center the work sufficiently accurately, but for ring gears or other work where extreme accuracy is required or desirable, the locating plate or ring 21 may be formed with accurate pilot surfaces to insure proper centering. For example, as shown in Figures 1 and 3, a pilot surface 201 may be formed thereon over which the ring gear 23 may be placed by hand, and between this pilot surface and the end plate 21 with which the ring gear may be pressed into contact, may be formed an annular pilot surface 200 over which the work may engage with a press fit.

In order that the work may be drawn on to and removed from this pilot portion 200, power means has been provided, as without some such means the use of such a tight fit would be impracticable, due to the time required to place and remove the work. This power means is shown in Figure 2. Referring to this figure it will be seen that the draw rod 28 is fixed at its outer end to a piston 80 slidable within a cylinder at 81. At 82 is shown a valve for controlling fluid pressure through pipes 83 and 84 to either side of the piston 80 at will, the fluid pressure being exhausted simultaneously from the opposite side of the piston to that on which pressure is supplied.

As above pointed out, the flanges 40 are relatively short so that when the pin elements 37 are retracted the work may be pushed over these flanges and into engagement with the pilot surface 201 over which it loosely fits so that it may be readily placed by hand. On movement of the rod 25 inwardly the elements 37 are forced apart radially into engagement with the work and on continued inward movement of the rod 25 the holder 35 with the pin elements 37 is moved toward the locating plate. The flanges 40 then engaging the outer face of the work act to force it on to the tight fitting pilot portion 200, and against the end face of the locating plate 21.

After the machining operation has been effected and it is desired to remove the work, the rod 25 is moved outwardly by manipulation of the valve 82, this permitting the elements 37 to retract radially, but in their fully retracted position as shown in Figure 3, the flanges 39 project beyond the inner edge of the work so that when the jaws are moved outwardly by bodily movement of the holder 35 the work is engaged and pressed off of the pilot portion 200 on to the pilot portion 201 from which it may be removed by hand.

It will be noted that the rod 25 is provided with an annular shoulder 202 which, as the rod 25 is moved outwardly, engages on the inner face of the holder 35 so that this holder is positively removed, carrying the elements 35 and the work engaging jaws therewith. The extent to which the holder 35 may be moved outwardly is limited by a series of stop pins 65 which pass through counterbored perforations 66 in the holder and having their inner ends, as at 67, threaded into the adapter plate 8. The heads 68 of these stop pins ride in the enlarged portions of the perforations 66 and impinge on the annular shoulders 69 at the inner ends of the counterbored portions as the holder 35 moves outwardly to the desired extent. The holder is normally held outwardly to this limit in position for the elements 37 to be retracted in order to receive work or permit work to be removed from the pilot portion 201, for this purpose springs 61 being employed. As shown these springs are carried by centering pins 62 projecting from the flange portion 15 and entering suitable sockets 63 in the holder 35, these sockets being of sufficiently larger diameter than the pins 62 to permit the springs 61 to be housed therein when the holder 35 is brought into its clamping position.

The locating plate 21 preferably extends inwardly of the outer ends of the jaws 38 and to permit the proper movement of these jaws is slotted as at 75 to receive them. The locating plate may also have outwardly extending pins 76 for engagement through spaced holes 77 in the work, this work, if it be a ring gear, being commonly provided with such perforation.

The rod 25 may be perforated axially as at 70 to the interior of the socket portion 26 and extending laterally from the perforation 70 and the socket portion may be formed ducts 71. Oil may thus be directed into the perforation 70 and the socket 26 to find its way through the ducts 71 to the outer face of the rod 25 so that it may be lubricated for its axial motion relative to the members externally thereof.

Having thus described an embodiment of this invention it should be evident that various changes and modifications might be made therein without departing from its spirit or scope as defined by the appended claims.

I claim:

1. A device of the class described comprising a locating plate having a pilot on which work may be placed with a press fit, a member movable toward and from said plate, means carried by said member engageable with the work to push the work on to and off from said pilot, and power means for moving said member.

2. A device of the class described comprising a locating plate having a pair of adjacent pilot portions, one of said pilot portions being of a size to provide a press fit for work and the other pilot portion being shaped to loosely engage the work, and a power actuated member for moving the work alternately from one to the other of said pilot portions.

3. A device of the class described comprisings a locating plate, a plurality of radially movable elements directly engageable with work, on opposite sides, and means for moving said elements in unison toward and from said plate to clamp the work thereagainst and to release and positively remove the work therefrom.

4. A device of the class described comprising a locating plate, a plurality of radially movable elements each engageable with work on opposite sides, and means for moving said elements in unison toward and from said plate to clamp the work thereagainst and to positively remove the work therefrom and for moving said elements relatively to engage and release the work.

5. A device of the class described comprising a locating plate, a plurality of radially movable elements, each engageable with opposite sides of work, and a member actuable to move said elements relatively to engage the work and in unison to clamp work against said plate and to remove work therefrom.

6. A device of the class described comprising a locating plate, a holder movable toward and from said plate, radially movable elements on said holder, and a member movable axially of said plate acting on movement in one direction to move said elements relatively to engage work and then to move said holder toward said plate and clamp the work thereagainst, and acting on movement in the opposite direction to move said holder from said plate said element being formed to engage and remove the work from said plate when said holder is moved from said plate.

7. A device of the class described comprising a locating plate, a rod movable axially of said plate, a holder on said rod, radially movable elements carried by said holder each having a beveled inner end adapted to ride in a corresponding beveled depression in said rod, whereby said elements may be radially projected on movement of said rod relatively thereto in one direction means for urging said elements retracted into contact with said rod, a work engaging jaw at the outer end of each element, an abutment on said rod engaging said holder when said elements have been projected by movement of said rod to move said holder toward said plate on further movement of said rod in the same direction, means for urging said holder from said plate, and means for moving said rod.

8. A device of the class described comprising a locating plate, a rod movable axially of said plate, a holder on said rod, radially movable elements carried by said holder each having a beveled inner end adapted to ride in a corresponding beveled depression in said rod, whereby said elements may be radially projected on movement of said rod relatively thereto in one direction, means for urging said elements retracted into contact with said rod, a work engaging jaw at the outer end of each element, an abutment on said rod engaging said holder when said elements have been projected by movement of said rod to move said holder toward said plate on further movement of said rod in the same direction, means for urging said holder from said plate, and a stop to limit the extent of such urging movement.

9. A device of the class described comprising a locating plate, a plurality of work engaging jaws each engageable with opposite sides of the work, and means actuable to relatively move said jaws to engage the work and then to move said jaws in unison to clamp the work against said plate, and actuable to move said jaws in unison to remove the work from said plate.

10. A device of the class described comprising a locating plate having a pair of pilot portions, one of said portions being of a size to permit work to engage therewith with a tight fit and the other of a size to loosely engage the work, a member movable axially of said plate, radially movable elements carried by said member, and means actuable to move said elements relatively to engage work placed on said other pilot portion and then bodily to move the work on to said one pilot portion, said elements being also actuable to move the work from said one pilot portion to said other pilot portion.

11. A device of the class described comprising a locating plate having a face portion and a pair of pilot portions, the inner one of said pilot portions adjacent to said face portion being of a size to permit work to engage therewith with a tight fit, and the outer pilot portion of a size to loosely engage the work, a member movable axially of said plate, radially movable elements carried by said member, each of said elements having an inner relatively long jaw portion and an outer relatively shorter jaw portion spaced to permit the work to be engaged by said elements therebetween, and means actuable to move said elements relatively to engage the work placed on said outer pilot portion and then to move said member to cause said relatively short jaw element to engage the outer face of said jaw element and move it into engagement with said inner pilot member and into contact with said face portion, said means being also actuable to move said member to cause said relatively long jaw portion to engage one face of the work and move it off from said inner pilot member on to said outer pilot member, said relatively long jaw portions being of sufficient length to engage the work when said elements are retracted, said relatively short jaw portions when said elements are retracted being out of engagement with the work and permitting work to be moved freely therepast into engagement with said outer pilot portion.

In testimony whereof I have affixed my signature.

JOHN E. LOVELY.